Sept. 8, 1925.
A. E. OSBORN
1,552,945
TRANSMISSION GEARING
Original Filed Dec. 18, 1922   2 Sheets-Sheet 1
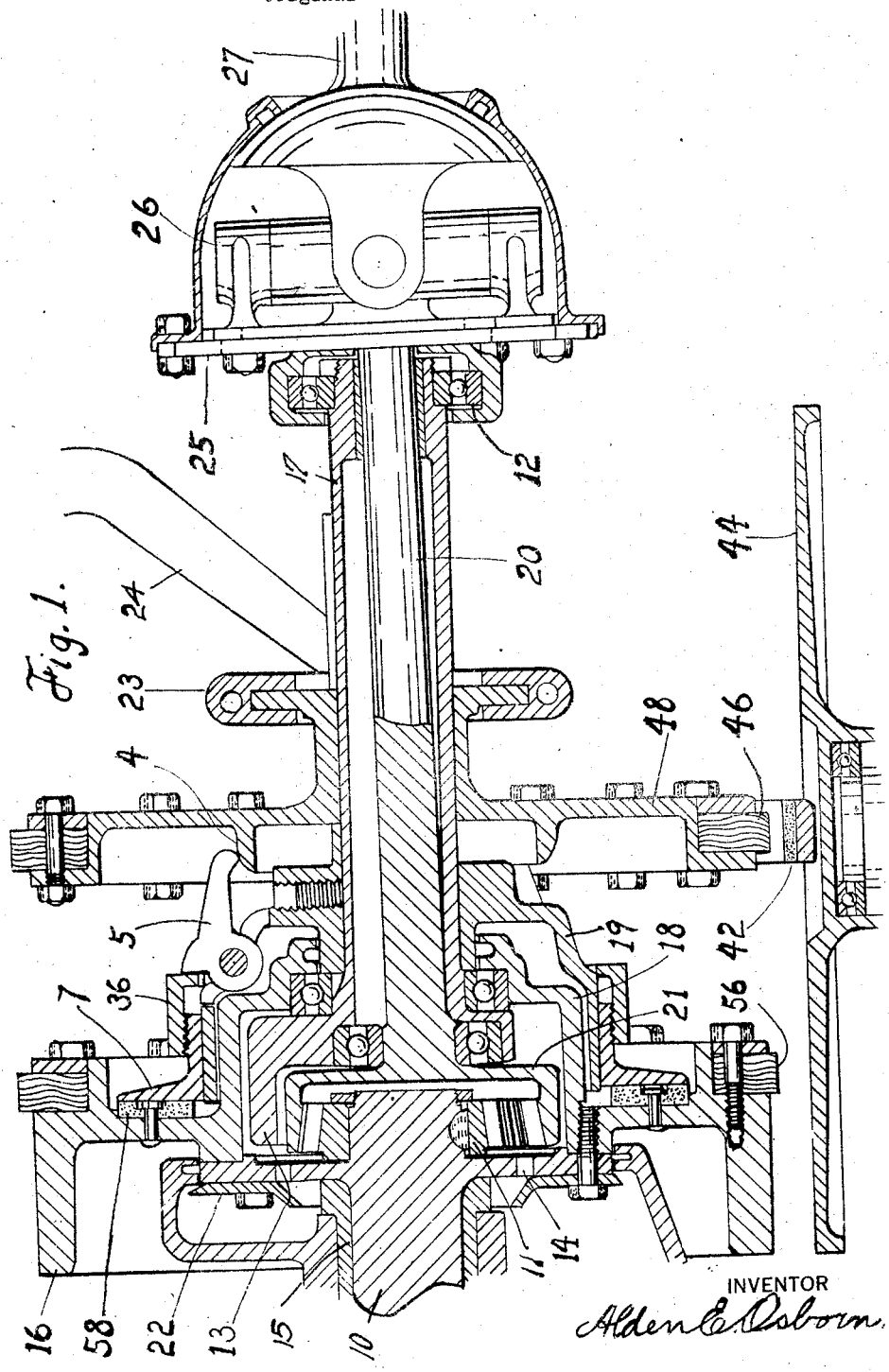
INVENTOR
Alden E. Osborn

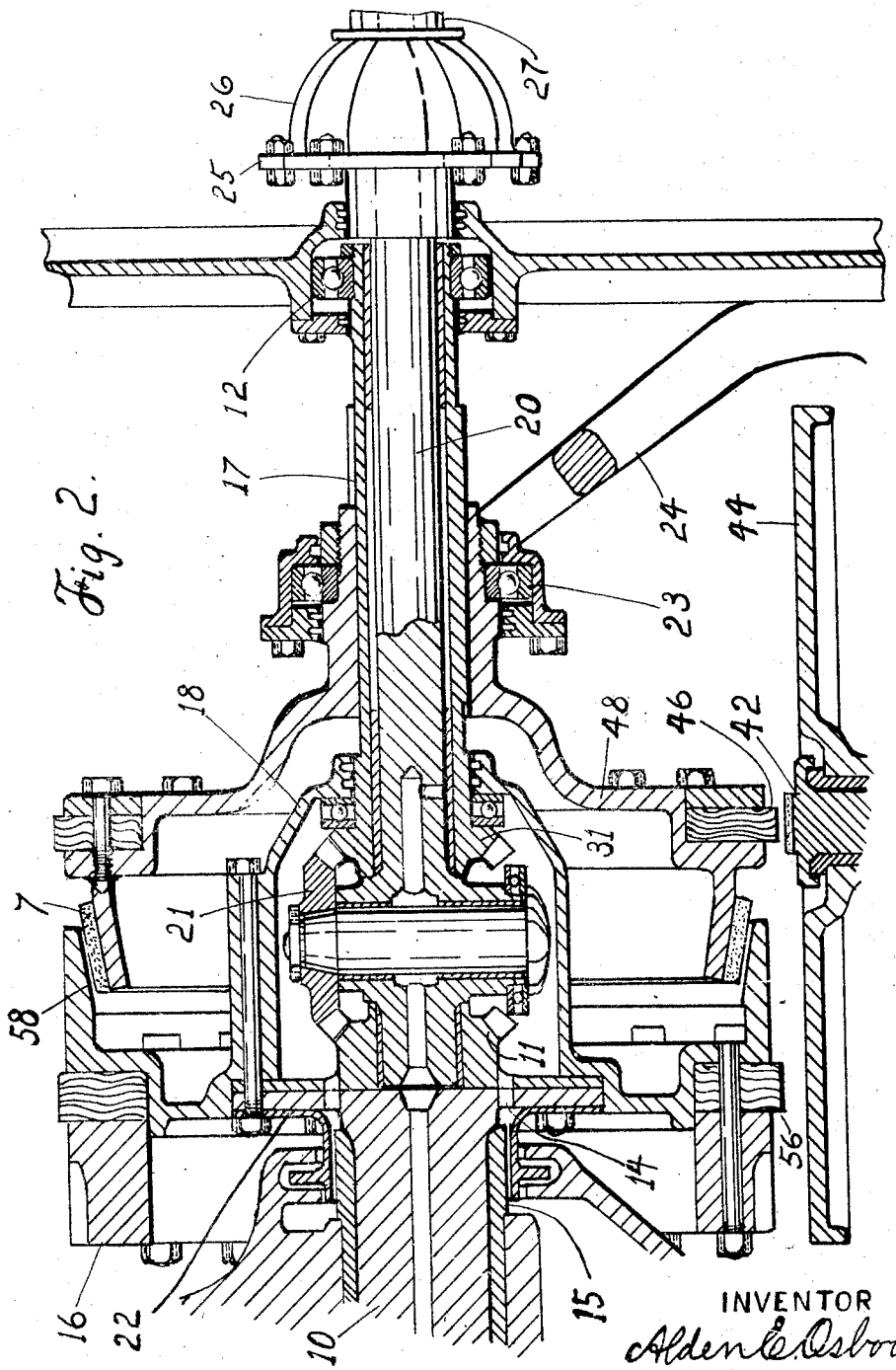

Patented Sept. 8, 1925.

1,552,945

UNITED STATES PATENT OFFICE.

ALDEN E. OSBORN, OF NEW YORK, N. Y.

TRANSMISSION GEARING.

Application filed December 18, 1922, Serial No. 607,622. Renewed April 20, 1925.

*To all whom it may concern:*

Be it known that I, ALDEN E. OSBORN, a citizen of the United States of America, and a resident of New York, county of the Bronx, and State of New York, have invented certain new and useful Improvements in Transmission Gearing, of which the following is a specification.

My invention relates to certain improvements in transmission gearing that are particularly adapted to be used with transmission gearing of the type disclosed in my Patents Nos. 995,552 dated June 20, 1911, 1,213,531, dated Jan. 23, 1917, and 1,412,214 dated April 11, 1922. It refers especially to the arrangement of the gearing and to the provision for oiling the important parts of the mechanism from the oiling system of the motor with which it is used.

In the accompanying drawings—

Figure 1 represents a longitudinal sectional view of one form of my invention and Figure 2 represents a longitudinal sectional view of a modification of Figure 1.

In Fig. 1, 10 indicates the driving element which is shown as the crank shaft of the engine and 20 indicates the driven element which is in the form of a shaft connected to the driving member 25 of the universal joint 26 which is connected thru the shaft 27 to the wheels or other parts to be driven. The driving element 10 carries the gear 11 which in turn meshes with an internal gear 21 mounted on the driven shaft or element 20. This driven shaft or element is supported in bearings by the hollow member 17 with its axis eccentric to the axis of rotation of the driving element 10 and member 17 to an extent sufficient to enable the internal gear to mesh with the driving pinion 11. The mount 17 is carried at one end in a bearing in the casing 18 which is shown as forming a part of the engine fly-wheel 16 and at the other end, adjacent to the universal joint 26, by a supporting bearing 12 carried by the framing or engine. The member 17 is provided with a balance weight 13 to prevent vibration, thru the driven shaft 10 being eccentric to its axis of rotation, and is also provided with suitable keys on its exterior which serve to slidably carry the drum or wheel 48 that is provided with a frictional, driving or working surface 46 having the same diameter as the frictional surface 56 on the fly-wheel 16. The member 17 also carries the drum 19 on which the clutch dogs 5 are pivoted which dogs act against the clutch adjusting nut 36 that is threaded on to the clutch member 7 so that when these dogs 5 are expanded by the cam 4 on the sliding wheel 48, the clutch member 7 would be pressed against the clutch surface 58 on the fly-wheel 16.

In order to slide the wheel 48, I have shown a collar 23 that is actuated by a lever 24 which can be controlled by the operator. The frictional surfaces 46 and 56 are arranged so that a disc 44 can be brought in to contact with them and transmit the drive from one to the other. The surface 46 can also be brought in the position shown in the figure and thus be held by the brake shoe 42 which is movable with the disc 44 and is operated by the same controlling mechanism.

In order to provide for oiling the gearing and internal parts of this device, I have provided openings 14 in the flange on the driving element 10 and arranged a suitable guide 22 so that oil coming out of the end of the shaft bearing 15 would be guided into these openings and thus fill the casing with oil from the engine oiling system. These openings would, of course, be of larger radius from the center of the crank shaft than the opening in the casing 18 thru which the shafts extend so that only a small amount of oil would be retained in the casing and it would not leak out around the shaft openings which are also grooved to retain the oil. By this means the working parts of the mechanism would be oiled without any particular attention, The operation of this mechanism is as follows:—

With the parts in the position shown, the movement of the disc 44 toward the axis of the gearing would bring the shoe 42 into contact with the drum or wheel friction surface 46 so that the member 17 would be held from rotation and thus cause the driving gear 11 to rotate the internal gear 21 and driven shaft 20 and parts connected thereto at a lower speed than the driving element and gear 11. This would constitute a very efficient intermediate speed—the universal joint 26 taking care of the slight angularity between the shaft 20 and driven shaft 27. If the drum or wheel 48 is moved along the member 17 toward the fly-wheel 16, the clutch members 5, 36, and 7 are acted upon to engage the clutch and lock the member 17 to the driving shaft 10 thus preventing any movement in the gear system and carry the driven element 20 around with the driving element 10 forming the direct drive. By moving the wheel 48 to the other side of the brake shoe 42 and away from the fly-wheel, it could be given, by engaging the disc 44, different speeds in relation to the speed of the driving element 10 and thus if it is moved to a position where it is caused to rotate slower than its rate of rotation with the driven element 20 stationary, motion would be transmitted to the driven element 20 at a slower speed than would be the case when the wheel is held stationary and if it is moved to a position still further away from the fly-wheel 16 so that it is driven at a faster speed than its normal speed in relation to the driving element, the driven element would be given a backward rotation in relation to the driving element. The first position would give a very low speed forward to the driven element, while the second position would give a reverse and it is obvious that any rate of rotation can be given to the driven element between these extremes by engaging the disc 44 when the wheel 48 is in different positions.

This form of my mechanism is a modification of the mechanism shown in my patents above referred to and operates on exactly the same principle altho employing a simpler form of gearing.

It is not essential that the oiling system disclosed in this figure should be limited in its application to a gear of this particular kind, for it can be used with any other form of planetary gear that revolves with the engine shaft and can be enclosed in a casing adjacent to the engine.

The modification shown in Figure 2 operates on the same principle as the form just described and as the forms disclosed in the patents above referred to. The gearing in this form comprises three bevel or miter gears 11, 21 and 31. The gear 11 being connected to the driving element 10, the gear 21 being rotatably mounted on the driven element 20 and the gear 31 being connected to the member 17 which member carries the drum or wheel 48. The gearing is enclosed in a casing 18 forming a part of the fly-wheel 16 and this casing is arranged to contain oil from the engine oiling system. In this form of my invention, the oil is conducted into the casing from the driving element or shaft 10 and after oiling the parts can pass out of the casing back into the engine crank case thru the openings 14 thus insuring the oiling of the gear parts thru the pressure feed system of the engine with which the gearing is used. The radius from the center of the crank shaft of the holes or openings 14 would be larger than the diameter of the opening thru which the gear shafts extend so that the oil could drain back into the crank case before reaching a high enough level to escape from the shaft opening.

This arrangement of oiling system, like that in Figure 1, can of course, be used with other forms of planetary transmission gearing and enables the thorough lubrication of the gear parts without any attention.

Having thus described my invention I claim as new and desire to secure by Letters Patent:—

1. In a transmission gearing the combination with an engine having a crank shaft and an enclosing casing therefor, of a second casing attached to said crank shaft and revolving therewith, a gear system within said revolving casing and having a power transmitting shaft extending from said revolving casing thru an opening therein, an oil passage thru said crank shaft and into said revolving casing and an oil passage from said revolving casing and into the engine case, the latter oil passage being at greater radius from the axis of said crank shaft than the diameter of said opening thru which the power transmitting shaft extends from said revolving casing.

2. In a transmission gearing the combination with an engine having a crank shaft and an enclosing casing therefor, of a second casing attached to said crank shaft and revolving therewith, a gear system within said revolving casing and having a power transmitting shaft extending from said revolving casing thru an opening therein, means whereby the oil from said engine can enter said revolving casing and an opening in said revolving casing at a greater radius from the axis of said crank shaft than the diameter of said opening thru which the power transmitting shaft extends from said revolving casing.

3. In a transmission gearing the combination with an engine having a crank shaft and an enclosing casing therefor, of a second casing attached to said crank shaft and revolving therewith, a gear system within said revolving casing and having a power transmitting shaft extending from said revolving casing thru an opening therein, an opening in said revolving casing at a greater radius from the axis of said crank shaft than the diameter of said opening thru which the power transmitting shaft extends from said revolving casing whereby oil contained in said revolving casing can escape thru said second named opening into the crank case and cannot reach as high a level as the said power transmitting shaft opening and escape thru the same.

4. In a transmission gearing the combination with an engine having a crank shaft and an enclosing casing therefor, of a second casing attached to said crank shaft and revolving therewith, a gear system within said revolving casing and having a power transmitting shaft extending from the said revolving casing thru an opening therein, an opening in said revolving casing at a greater radius from the axis of said crank shaft than the diameter of said opening thru which the power transmitting shaft extends from said revolving casing, and means whereby oil in the engine casing is conducted into said revolving casing to the level of said second named opening and below the level of the first named opening thru which said power transmitting shaft extends whereby said oil cannot escape thru said power transmitting shaft opening.

5. In a transmission gearing the combination of driving and driven elements, a gear attached to the driving element, a gear attached to the driven element and meshing with said gear on the driving element and having its axis of rotation eccentric to and at an angle with the axis of rotation of the driving element and a restrainable element rotatably supporting said driven element with its axis at an angle to the axis of the driving element, controllable means for holding said restrainable element from revolving to cause said gear on said driving element to rotate said gear attached to said driven element and turn said element at a lower speed than said driving element revolves, and means for transmitting the motion of said driven element to a shaft with its axis substantially intersecting the axis of rotation of the driving element.

6. In a transmission gearing the combination of driving and driven elements, a gear attached to the driving element, a gear attached to the driven element and meshing with said gear on the driving element and having its axis of rotation eccentric to and at an angle with the axis of rotation of the driving element, and a casing enclosing said gears and attached to the driving element, and a restrainable element extending from said casing and rotatably supporting said driven element with its axis at an angle to the axis of the driving element, controllable means for holding said restrainable element from revolving to cause said gear on the driving element to rotate said gear attached to the driven element to turn said element at a lower speed than the driving element revolves, and a universal joint to transmit the motion of said driven element to a shaft with its axis substantially intersecting the axis of rotation of the driving element.

7. In a transmission gearing the combination of driving and driven elements, a gear attached to the driving element, a gear attached to the driven element and meshing with said gear on the driving element and having its axis of rotation eccentric to and at an angle with the axis of rotation of the driving element, a restrainable element rotatably supporting said driven element with its axis at an angle to the axis of the driving element, controllable means for holding said restrainable element from revolving to cause said gear on said driving element to rotate said gear attached to said driven element to turn said element at a lower speed than said driving element revolves, controllable means for locking said driving, driven and restrainable elements together to turn as a unit, and means for transmitting the motion of said driven element to a shaft with its axis substantially intersecting the axis of rotation of said driving element.

8. In a transmission gearing the combination of driving and driven elements, a gear attached to the driving element, a gear attached to the driven element and meshing with said gear on the driving element and having its axis of rotation eccentric to and at an angle with the axis of rotation of the driving element, a restrainable element rotatably supporting said driven element with its axis at an angle to the axis of the driving element, controllable means for holding said restrainable element from revolving to cause said gear on said driving element to rotate said gear attached to said driven element to turn said element at a lower speed than said driving element revolves, and a friction clutch for locking said driving, driven and restrainable elements together to turn as a unit and means for transmitting the motion of said driven element to a shaft with its axis substantially intersecting the axis of rotation of said driving element.

In witness whereof, I have hereunto set my hand this 11th day of December, 1922.

ALDEN E. OSBORN.